United States Patent
Prakash et al.

(10) Patent No.: US 11,221,606 B2
(45) Date of Patent: Jan. 11, 2022

(54) SYSTEM AND METHOD FOR DEPICTING AND USING ONE LOGICAL CONNECTION WITH COLLECTION OF INPUT/OUTPUT (I/O) MODULES AS MULTIPLE INDIVIDUAL LOGICAL CONNECTIONS

(71) Applicant: Honeywell International Inc., Morris Plains, NJ (US)

(72) Inventors: Suraj Prakash, Ranchi (IN); Sameer Gupta, Lucknow (IN); Laxmana Rao Paruchuri, Kollipara (IN)

(73) Assignee: Honeywell International Inc., Morris Plains, NJ (US)

( * ) Notice: Subject to any disclaimer, the term of this patent is extended or adjusted under 35 U.S.C. 154(b) by 131 days.

(21) Appl. No.: 16/045,380

(22) Filed: Jul. 25, 2018

(65) Prior Publication Data

US 2019/0094828 A1    Mar. 28, 2019

Related U.S. Application Data

(60) Provisional application No. 62/563,194, filed on Sep. 26, 2017.

(51) Int. Cl.
*G05B 19/042*    (2006.01)
*G05B 19/05*    (2006.01)
(Continued)

(52) U.S. Cl.
CPC ......... *G05B 19/0423* (2013.01); *G05B 19/05* (2013.01); *G06F 3/04842* (2013.01);
(Continued)

(58) Field of Classification Search
None
See application file for complete search history.

(56) References Cited

U.S. PATENT DOCUMENTS 6,473,794 B1 * 10/2002 Guheen ................... H04L 41/22
                                                        709/223
7,082,106 B2 * 7/2006 Sharma ............... H04L 12/6418
                                                        370/276
(Continued)

OTHER PUBLICATIONS

Hans Turck GmbH & Co. KG, "BL20-User Manual, Multiprotocol Gateway for Ethernet BL20-E-GW-EN", see esp. Sections 5.3 & 5.4, Jul. 2013, 279 pages.
(Continued)

*Primary Examiner* — Henry Tsai
*Assistant Examiner* — Christopher A Bartels
(74) *Attorney, Agent, or Firm* — Paschall & Associates. LLC; James C. Paschall

(57) ABSTRACT

A method includes presenting a graphical user interface to a user, where the graphical user interface identifies multiple slots that are configured to be coupled to multiple input/output (I/O) modules. The method also includes receiving, from the user via the graphical user interface, information defining a slot assembly data map. The slot assembly data map identifies data offsets and data sizes associated with the I/O modules. The data offsets and the data sizes identify where data can be sent to or received from the multiple I/O modules over a single logical connection. The method further includes using the data offsets and the data sizes of the slot assembly data map to provide data to or receive data from one or more of the I/O modules over the single logical connection.

17 Claims, 7 Drawing Sheets

(51) Int. Cl.
*G06F 8/65* (2018.01)
*G06F 9/451* (2018.01)
*G06F 3/0484* (2013.01)
*G06F 9/445* (2018.01)
*G06F 8/654* (2018.01)

(52) U.S. Cl.
CPC ............ *G06F 8/65* (2013.01); *G06F 9/44505* (2013.01); *G06F 9/453* (2018.02); *G06F 8/654* (2018.02); *G06F 9/451* (2018.02)

(56) References Cited

U.S. PATENT DOCUMENTS

| | | | | |
|---|---|---|---|---|
| 8,150,959 | B1* | 4/2012 | Bezdicek | G05B 23/027 709/224 |
| 9,282,384 | B1* | 3/2016 | Graves | H04Q 11/0005 |
| 10,235,399 | B2* | 3/2019 | Adamson | G06F 12/08 |
| 2002/0152335 | A1* | 10/2002 | Holm | G06F 13/4004 710/8 |
| 2006/0109376 | A1* | 5/2006 | Chaffee | G05B 19/0423 348/423.1 |
| 2007/0076264 | A1 | 4/2007 | Pierce et al. | |
| 2007/0250180 | A1 | 10/2007 | Bump | |
| 2011/0022192 | A1* | 1/2011 | Plache | G05B 19/4188 700/28 |
| 2011/0191500 | A1 | 8/2011 | Odayappan | |
| 2011/0320772 | A1* | 12/2011 | Craddock | G06F 3/067 712/205 |
| 2012/0185632 | A1* | 7/2012 | Lais | G06F 13/404 710/308 |
| 2014/0047137 | A1* | 2/2014 | Mathason | G05B 19/0423 710/33 |
| 2015/0106616 | A1* | 4/2015 | Nix | H04L 9/30 713/156 |
| 2015/0248299 | A1* | 9/2015 | Rasband | H04W 16/26 713/2 |
| 2016/0020967 | A1* | 1/2016 | Thubert | H04W 40/248 370/252 |
| 2016/0314002 | A1* | 10/2016 | Khatri | G06F 9/4403 |
| 2016/0357665 | A1* | 12/2016 | Lee | G06F 3/0653 |
| 2019/0220228 | A1* | 7/2019 | Kim | G06F 3/0679 |
| 2020/0073840 | A1* | 3/2020 | Mekad | G06F 9/4411 |
| 2020/0106743 | A1* | 4/2020 | Park | H04L 63/308 |

OTHER PUBLICATIONS

Rockwell Automation, "Assembly Connections for POINT I/O and ArmorPOINT I/O EtherNet/IP Adapters", User Manual, Nov. 2016, 80 pages.
Rockwell Automation, "EtherNet/IP Performance", Oct. 2004, 52 pages.
Search Report for corresponding EP Application No. 18861005.9 dated May 10, 2021.
Frank: "Chapter 2: PLC Hardware Components" In: "Programmable Logic Controllers 4th Edition", Sep. 3, 2010 (Sep. 3, 2010), McGraw-Hill Education, XP055798753, ISBN: 978-93-526-0212-4, pp. 17-42.
Anonymous: "Configuration file—Wikipedia", Aug. 28, 2017 (Aug. 28, 2017), pp. 1-4, XP055798331.
"EPO Search Report and Written Opinion for US2018/050401", dated May 10, 2021.
"International Search Report and Written Opinion—PCT/US2018/050401", dated Dec. 13, 2018.
Anonymous, "Configuration file—Wikipedia", Aug. 28, 2017, pp. 1-4, Publisher: Wikipedia.
Petruzella, Frank, "Chapter 2: PLC Hardware Components", Programmable Logic Controllers, 4th Edition, Sep. 3, 2010, pp. 1-26, Publisher: McGraw-Hill Education.

* cited by examiner

SYSTEM AND METHOD FOR DEPICTING AND USING ONE LOGICAL CONNECTION WITH COLLECTION OF INPUT/OUTPUT (I/O) MODULES AS MULTIPLE INDIVIDUAL LOGICAL CONNECTIONS

CROSS-REFERENCE TO RELATED APPLICATION AND PRIORITY CLAIM

This application claims priority under 35 U.S.C. § 119(e) to U.S. Provisional Patent Application No. 62/563,194 filed on Sep. 26, 2017. This provisional application is hereby incorporated by reference in its entirety.

TECHNICAL FIELD

This disclosure generally relates to industrial process control and automation systems and other systems using input/output (I/O) modules. More specifically, this disclosure relates to a system and method for depicting and using one logical connection with a collection of I/O modules as multiple individual logical connections.

BACKGROUND

Industrial process control and automation systems are often used to automate large and complex industrial processes. These types of control and automation systems routinely include process controllers and field devices like sensors and actuators. Some of the process controllers typically receive measurements from the sensors and generate control signals for the actuators. Interactions with the sensors and actuators often occur through input/output (I/O) modules, which are installed between the controllers and the field devices.

Many conventional control and automation systems need to integrate a wide variety of devices from a number of third-party vendors. Many vendors have a "chassis" sort of arrangement for their I/O modules. In this design approach, a head end module connects to an external network, and I/O modules communicate with the head end module through a backplane. Process controllers or other devices communicate with the I/O modules via the external network, the head end module, and the backplane.

SUMMARY

This disclosure provides a system and method for depicting and using one logical connection with a collection of input/output (I/O) modules as multiple individual logical connections.

In a first embodiment, a method includes presenting a graphical user interface to a user, where the graphical user interface identifies multiple slots that are configured to be coupled to multiple I/O modules. The method also includes receiving, from the user via the graphical user interface, information defining a slot assembly data map. The slot assembly data map identifies data offsets and data sizes associated with the I/O modules. The data offsets and the data sizes identify where data can be sent to or received from the multiple I/O modules over a single logical connection. The method further includes using the data offsets and the data sizes of the slot assembly data map to provide data to or receive data from one or more of the I/O modules over the single logical connection.

In a second embodiment, an apparatus includes at least one processing device configured to generate a graphical user interface for presentation to a user, where the graphical user interface identifies multiple slots that are configured to be coupled to multiple I/O modules. The at least one processing device is also configured to receive, from the user via the graphical user interface, information defining a slot assembly data map. The slot assembly data map identifies data offsets and data sizes associated with the I/O modules. The data offsets and the data sizes identify where data can be sent to or received from the multiple I/O modules over a single logical connection. The at least one processing device is further configured to use the data offsets and the data sizes of the slot assembly data map to provide data to or receive data from one or more of the I/O modules over the single logical connection.

In a third embodiment, at least one non-transitory computer readable medium contains instructions that when executed cause at least one processing device to generate a graphical user interface for presentation to a user, where the graphical user interface identifies multiple slots that are configured to be coupled to multiple I/O modules. The at least one medium also contains instructions that when executed cause the at least one processing device to receive, from the user via the graphical user interface, information defining a slot assembly data map. The slot assembly data map identifies data offsets and data sizes associated with the I/O modules. The data offsets and the data sizes identify where data can be sent to or received from the multiple I/O modules over a single logical connection. The at least one medium further contains instructions that when executed cause the at least one processing device to use the data offsets and the data sizes of the slot assembly data map to provide data to or receive data from one or more of the I/O modules over the single logical connection.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
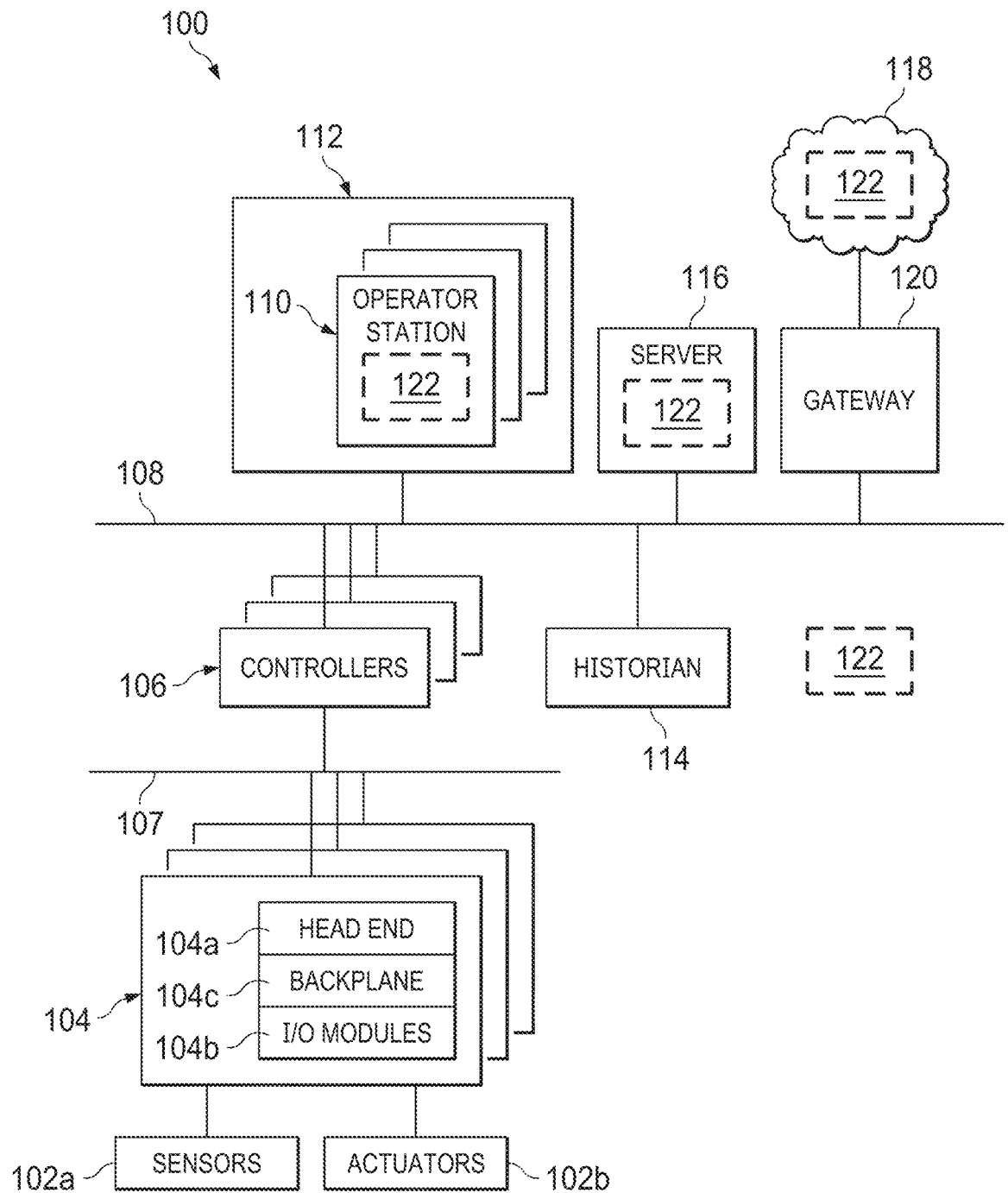
FIG. 1 illustrates an example industrial process control and automation system according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, many conventional industrial process control and automation systems need to integrate a wide variety of devices from a number of third-party vendors. Many vendors have a "chassis" sort of arrangement for their input/output (I/O) modules where (i) a head end module connects to an external network and (ii) I/O modules communicate with the head end module through a backplane. Interactions by process controllers or other devices with the I/O modules can occur via the external network, the head end module, and the backplane.

Vendors typically provide two ways for communicating with individual I/O modules. In some prior approaches, a direct connection can be established with each individual I/O module. In these approaches, a protocol connection (such as an EtherNet/IP connection) is made from a process controller or other device directly to each individual I/O module. Such connections are often referred to as "bridged" connections. The head end module acts as a gateway and bridges one or more external clients (the process controller or other device) to the individual I/O modules over the backplane. One connection from the head end module is created for each I/O module, so n connections are used to connect to n I/O modules over the backplane. As a result, this can require a large amount of connection resources in both the head end module and the external client(s). Moreover, while the EtherNet/IP protocol allows direct module connections, a scanner device needs information identifying the data to be obtained from or provided to a specific I/O module. In addition, since an Ethernet connection may need to be established to a network adapter module, I/O module connections have to be done via the network adapter module.

In other prior approaches, a rack or assembly connection can be provided to a head end module or other gateway module. In these approaches, a single connection is made from a process controller or other device to a head end module or other gateway module, which is itself coupled to a collection of I/O modules via the backplane. All of the I/O modules in the collection provide data to or accept data from the process controller or other device over the single connection resource via the backplane and the head end module or other gateway module. The I/O modules often send data to and receive data from the head end module or other gateway module using a proprietary protocol.

These approaches can suffer from various shortcomings. For example, protocols such as EtherNet/IP and Common Industrial Protocol (CIP) provide a way to achieve valid connections with I/O modules, but there is no simple method for identifying, showing, and using the data provided by individual I/O modules. Also, protocols often provide a way to define a single consolidated configuration assembly (data defining a rack's configuration), a single consolidated input assembly (data produced by a rack), and a single consolidated output assembly (data produced by a connection originator, such as a process controller, and consumed by the rack). However, this requires the use of a single "blob" to depict all of the various assemblies mentioned above. This makes programming for using the data in the three assemblies (configuration, input, and output) extremely difficult. Further, a rack typically contains a collection of various I/O types, such as analog inputs, analog outputs, digital inputs, digital outputs, digital input sequences of events, and pulse accumulator inputs, which are used in different applications.

The use of a single "blob" forces a user to carefully program all data inputs and outputs by using calculations of data offsets and data sizes in the blob to separate the data inputs and outputs for the different applications. In addition, the data in the blob is parsed and used in a runtime environment using a control program, and the control program has to deal with non-control code/instructions to parse the data.

Typically, software representations of individual I/O modules exist and could be used in the programming of those I/O modules, but such representations may be available only when direct connections to the I/O modules are used. When rack or assembly connections are used, the creation of representations for individual I/O modules is a very tedious process and requires careful programming to split the data for the different applications.

This disclosure provides techniques for defining and using a generic adapter representation of a head end module or a collection of I/O modules and an associated slot assembly data map. A "slot" is associated with a specific I/O module in a rack or other collection and could represent the physical slot or other space into which the specific I/O module is inserted. The slot assembly data map allows one or more users to define, on a per slot basis, one or more data offsets and one or more data sizes for each individual slot. The slot assembly data map therefore provides information defining how data can be parsed automatically during runtime in order to communicate with the different I/O modules over a single logical connection. The generic adapter representation uses the slot assembly data map to define logical representations of the I/O modules in a rack or other collection. Software connections can be created and provided to the individual I/O modules in the rack or other collection, such as based on programming that uses the logical representations. This allows the use of representations of individual I/O modules even in a rack or assembly connection, thereby simplifying the overall programming experience. Optionally, data can also be obtained from one or more users defining how slot status processing occurs, which allows a controller or other device to identify diagnostic information for each I/O module received over the single logical connection. Additional details and advantages of these techniques are provided below.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102*a* and one or more actuators 102*b*. The sensors 102*a* and actuators 102*b* represent components in a process system that may perform any of a wide variety of functions. For example, the sensors 102*a* could measure a wide variety of characteristics in the process system, such as flow, pressure, or temperature. Also, the actuators 102*b* could alter a wide variety of characteristics in the process system, such as flow, pressure, or temperature. Each of the sensors 102*a* includes any suitable structure for measuring one or more characteristics in a process system. Each of the actuators 102b includes any suitable structure for operating on or affecting one or more process conditions in a process system.

At least one I/O module assembly 104 is coupled to the sensors 102a and actuators 102b. The I/O module assemblies 104 facilitate interaction with the sensors 102a, actuators 102b, or other field devices. For example, an I/O module assembly 104 could be used to receive one or more analog inputs (AIs), digital inputs (DIs), digital input sequences of events (DISOEs), pulse accumulator inputs (PIs), or other inputs from one or more field devices. An I/O module assembly 104 could also be used to provide one or more analog outputs (AOs), digital outputs (DOs), or other outputs to one or more field devices. These are examples of the types of I/O channels that could be supported by each I/O module assembly 104. Different I/O channel types are typically characterized by different inputs, outputs, voltages, currents, and configurations. A universal I/O (UIO) channel is a specialized I/O channel that is reconfigurable to operate as any of multiple I/O channel types. Example types of UIO circuits are shown in U.S. Pat. Nos. 8,072,098; 8,392,626; 8,656,065; and U.S. Patent Publication No. 2015/0278144 (all of which are hereby incorporated by reference in their entirety). UIO circuits that support UNIVERSAL CHANNEL TECHNOLOGY available from HONEYWELL INTERNATIONAL INC. are also suitable for use. Reconfigurable or non-reconfigurable I/O channels could be used in the I/O module assemblies 104 here.

Each I/O module assembly 104 includes any suitable structure(s) for receiving one or more input signals from or providing one or more output signals to one or more field devices. In some embodiments, each I/O module assembly 104 is implemented using (i) a head end module 104a that couples to and communicates with higher-level components and (ii) one or more I/O modules 104b that communicate with the head end module 104a over a backplane 104c or other structure. Each I/O module 104b can include one or more reconfigurable or non-reconfigurable I/O channels used to communicate with one or more field devices. In particular embodiments, the head end module 104a and the I/O modules 104b for one or multiple I/O module assemblies 104 could be placed into at least one rack or other structure.

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 107 couples one or more of the controllers 106 to one or more of the I/O module assemblies 104 and transports information between the coupled controllers 106 and I/O module assemblies 104. The network 107 also supports the formation of protocol or logical connections between the coupled controllers 106 and I/O module assemblies 104. The network 107 supports any suitable connections between controllers 106 and I/O module assemblies 104. For example, the network 107 could support the use of a single logical connection coupling a controller 106 to multiple I/O modules 104b in one I/O module assembly 104 via the head end module 104a of that I/O module assembly 104. Any suitable connection(s) supporting any suitable protocol(s) could be used in the system 100. In particular embodiments, the connections formed over the network 107 represent connections supporting the EtherNet/IP protocol, the CIP protocol, or other industrial networking protocol. These protocols can support the formation and use of protocol connections over an Ethernet network or other suitable network or combination of networks. Note that while a network 107 is shown here, it is also possible for one or more dedicated connections to be made between the one or more controllers 106 and the one or more I/O module assemblies 104.

At least one network 108 couples at least one of the controllers 106 and other devices in the system 100. The network 108 facilitates the transport of information between components. The network 108 could represent any suitable network or combination of networks. As particular examples, the network 108 could represent at least one Ethernet network.

Operator access to and interaction with the controllers 106 and other components of the system 100 can occur via various operator stations 110. Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator. For example, each operator station 110 could represent a computing device running a WINDOWS operating system or other operating system.

Multiple operator stations 110 can be grouped together and used in one or more control rooms 112. Each control room 112 could include any number of operator stations 110 in any suitable arrangement. In some embodiments, multiple control rooms 112 can be used to control an industrial plant, such as when each control room 112 contains operator stations 110 used to manage a discrete part of the industrial plant.

The control and automation system 100 here also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator stations 110 or other applications. The applications could be used to support various functions for the operator stations 110, the controllers 106, or other components of the system 100. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

In accordance with this disclosure, an adaptor tool 122 is provided in one or more components of the system 100 or as a stand-alone component in or coupled to the system 100. The adaptor tool 122 allows one or more users to define a generic adapter representation of a head end module 104a or an I/O module assembly 104 and a slot assembly data map for the I/O module assembly 104. A slot assembly refers to a collection of slots on a backplane 104c or other structure to which the I/O modules 104b of the I/O module assembly 104 are attached. The slot assembly data map allows the one or more users to define, on a per slot basis, the data offsets and data sizes for the I/O modules 104b coupled to the individual slots. This slot assembly data map can then be used by one or more controllers 106 or other devices to communicate with the I/O modules 104b over a single logical connection. For instance, data can be split using the slot assembly data map in order to support communications with the individual I/O modules 104b over a single logical connection with the head end module 104a. The generic adapter representation of the head end module 104a or the I/O module assembly 104 provides logical representations of the I/O modules 104b in the I/O module assembly 104. Software connections can be created and provided between one or more controllers 106 or other devices and individual I/O modules 104b in the I/O module assembly 104, which allows programming to occur using the logical representations of the I/O modules 104b. Optionally, the adaptor tool 122 can also obtain data from one or more users defining how slot status processing occurs, which allows one or more controllers 106 or other devices to identify diagnostic information for each I/O module 104b received over the single logical connection. This process can be supported for any number of I/O module assemblies 104, each with any number of I/O modules 104b.

The adaptor tool 122 can therefore provide a number of features and advantages depending on the implementation. For example, the adaptor tool 122 can help to segregate modular I/O data using individual logical I/O module objects in software. This provides a way to easily use a single rack connection for multiple I/O modules 104b, thereby reducing usage of connection resources and increasing capacity. Also, the adaptor tool 122 allows users to more easily create programs that use data like alarming, status, and diagnostic data associated with the configuration, input, and output assemblies discussed above. Moreover, software representations of individual I/O modules 104b can be consistent regardless of the connection type (direct or rack/assembly), and there may be little or no need to redefine the software representations for individual I/O modules 104b since the same representation can be used regardless of the connection type. Because of this, features such as alarming, diagnostics, and status processing related to individual I/O modules 104b can be readily available since the software representation does not change.

Further, the software representation of the I/O modules 104b in a distributed control system (DCS), programmable logic controller (PLC), or other device or system can mimic the real-world network and physical representations of the hardware modules. This allows project engineering or other activities to occur with the same context as the physical arrangement of components and related design documents. Beyond that, this approach removes the need to "dumb down" data into numbers, allowing process and diagnostic values to be exactly represented with their original meanings in software templates/representations in a PLC or DCS programming environment.

This functionality allows the replacement of an I/O module 104b with a like device or an unlike device, which is supported by allowing modification of the configuration of the per slot data map. This feature enables replacement scenarios without modifying a control program or application since data continues to be known as it exists per I/O module 104b instead of being identified, used, and programmed only as "bytes and bits". Physical reordering of the I/O modules 104b within a rack is similarly supported by allowing modification of the configuration of the per slot data map. In addition, even if a data format or arrangement changes (such as due to a firmware upgrade of an I/O module 104b), this is easily handled by allowing modification of the configuration of the per slot data map. Users may only need to change the data map to account for a data format or arrangement change. Finally, as a flexible programming interface, the adaptor tool 122 allows the splitting of data of a large device into multiple modules so as to logically/semantically group and modularize data per application.

Additional details regarding the adaptor tool 122 are provided below. Note that while the details below describe features of or functions that could be performed using one specific implementation of the adaptor tool 122, other implementations of the adaptor tool 122 could also be used. For example, while often described as using the EtherNet/IP protocol or the CIP protocol, any other suitable protocol or protocols could be used.

The adaptor tool 122 includes any suitable hardware or combination of hardware and software/firmware that supports the depiction and use of a logical connection with a collection of I/O modules as multiple individual logical connections. As a particular example, the adaptor tool 122 could be implemented using software that is executed by one or more processors of an operator station 110, server 116, computing cloud 118, remote server, or other device.

Although FIG. 1 illustrates one example of an industrial process control and automation system 100, various changes may be made to FIG. 1. For example, the system 100 could include any number of sensors, actuators, controllers, networks, operator stations, control rooms, historians, servers, adaptor tools, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment where the depiction and usage of a logical connection with a collection of I/O modules as multiple individual logical connections can be used. This functionality can be used in any other suitable system, and the system need not relate to industrial process control and automation.

Figure 2:
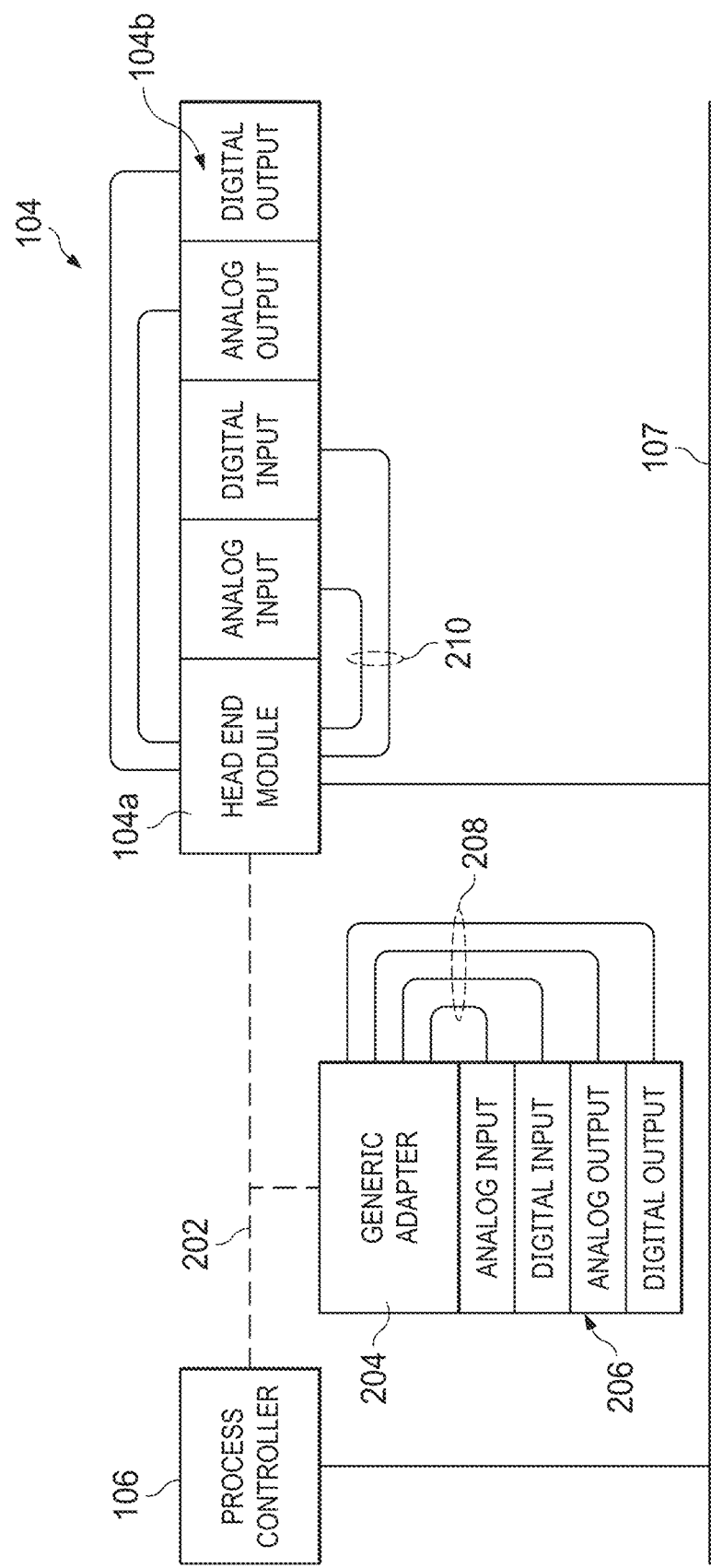
FIG. 2 illustrates an example technique for supporting the depiction and usage of one logical connection with a collection of input/output (I/O) modules as multiple individual logical connections according to this disclosure.

FIG. 2 illustrates an example technique for supporting the depiction and usage of one logical connection with a collection of I/O modules as multiple individual logical connections according to this disclosure. For ease of explanation, the technique shown in FIG. 2 is described as being used with various components in the system 100 of FIG. 1. However, the technique shown in FIG. 2 could be used with any suitable devices and in any suitable systems, and those devices and systems need not be used for industrial process control and automation.

As shown in FIG. 2, one of the controllers 106 communicates with a collection of I/O modules 104b in an I/O module assembly 104 via a single logical connection 202. More specifically, the controller 106 communicates with the head end module 104a of the I/O module assembly 104 using the single logical connection 202. The logical connection 202 represents the single logical channel through which data is transferred between the controller 106 and the I/O module assembly 104, even though the I/O module assembly 104 itself includes multiple modules 104b. The I/O module assembly 104 can be formed over the network 107 or other physical connection in any suitable manner, such as by using the EtherNet/IP or CIP protocol.

In order to support the depiction and use of the single logical connection 202 as multiple individual logical connections, a generic adapter 204 representing the head end module 104a or the I/O module assembly 104 can be created (such as with the adapter tool 122) and used (such as by the controller 106 or other device). The generic adapter 204 is associated with logical representations 206 of the I/O modules 104b in the I/O module assembly 104, where each logical representation 206 corresponds to one of the I/O modules 104b. Software connections between the controller 106 and the I/O modules 104b can be created through suitable programming using the logical representations 206, enabling data to be exchanged between the controller 106 and the I/O modules 104b. Thus, the generic adapter 204 supports the appearance of multiple logical connections 208 between the controller 106 and the I/O modules 104b, even though only a single logical connection 202 is actually used between the controller 106 and the I/O modules 104b. Connections 210 (physical or logical) between the head end module 104a and the I/O modules 104b exist, such as in the backplane 104c, in order to provide complete communication pathways between the controller 106 and the I/O modules 104b.

In some embodiments, the generic adapter 204 and its logical representations 206 are defined using a software application, such as software implementing the adaptor tool 122. The software application allows one or more users to define the logical representations 206, such as by allowing the users to define a slot assembly data map. As described below, the slot assembly data map allows the users to define a data offset and a data size for each individual slot, where each slot is associated with one of the logical connections 208 and with a different connection 210 between the head end module 104a and one of the I/O modules 104b. The slot assembly data map allows software (logical) connections to be provided between the controller 106 and the I/O modules 104b. At runtime, data can be split between the logical connections 208, allowing the controller 106 to interact with multiple I/O modules 104b over what appear to be separate logical connections 208 but which is actually a single logic connection 202.

Although FIG. 2 illustrates one example of a technique for supporting the depiction and usage of one logical connection with a collection of I/O modules as multiple individual logical connections, various changes may be made to FIG. 2. For example, each I/O module assembly 104 could be associated with any suitable type(s) and number(s) of I/O modules 104b and need not be associated with one of each of the four types of I/O modules shown in FIG. 2. Similarly, the generic adapter 204 could be associated with any suitable type(s) and number(s) of I/O modules 104b and need not be associated with one of each of the four types of I/O modules shown in FIG. 2. In addition, the controller 106 could interact with multiple I/O module assemblies 104, and at least one generic adapter 204 could be defined for each I/O module assembly 104.

Figure 3:
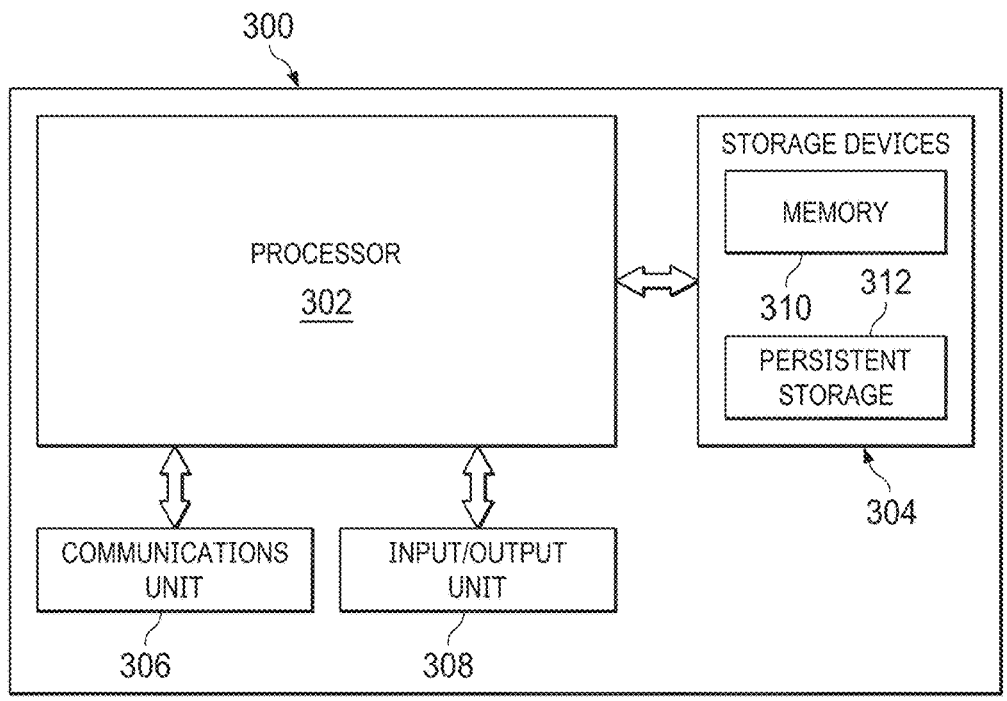
FIG. 3 illustrates an example device supporting the depiction and usage of one logical connection with a collection of I/O modules as multiple individual logical connections according to this disclosure.

FIG. 3 illustrates an example device 300 supporting the depiction and usage of one logical connection with a collection of I/O modules as multiple individual logical connections according to this disclosure. The device 300 could, for example, represent an operator station 110, server 116, or part of the computing cloud 118 of FIG. 1 that implements the adaptor tool 122. However, the adaptor tool 122 could be implemented using any other suitable device and in any other suitable system.

As shown in FIG. 3, the device 300 includes at least one processor 302, at least one storage device 304, at least one communications unit 306, and at least one I/O unit 308. The processor 302 executes instructions that may be loaded into a memory 310, such as instructions that (when executed by the processor 302) implement the functions of the adaptor tool 122. The processor 302 includes any suitable number(s) and type(s) of processors or other processing devices in any suitable arrangement. Example types of processors 302 include microprocessors, microcontrollers, digital signal processors, field programmable gate arrays, application specific integrated circuits, and discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 could include a network interface card or a wireless transceiver facilitating communications over a wired or wireless network. The communications unit 306 may support communications through any suitable physical or wireless communication link(s). Note, however, that the use of the communications unit 306 may not be needed, such as when the device 300 processes data locally and does not need to engage in network communications.

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device. Note, however, that the use of the I/O unit 308 for local I/O may not be needed, such as when the device 300 is accessible locally or remotely over a network connection.

Although FIG. 3 illustrates one example of a device 300 supporting the depiction and usage of one logical connection with a collection of I/O modules as multiple individual logical connections, various changes may be made to FIG. 3. For example, computing devices come in a wide variety of configurations, and FIG. 3 does not limit this disclosure to any particular computing device.

Figure 4:
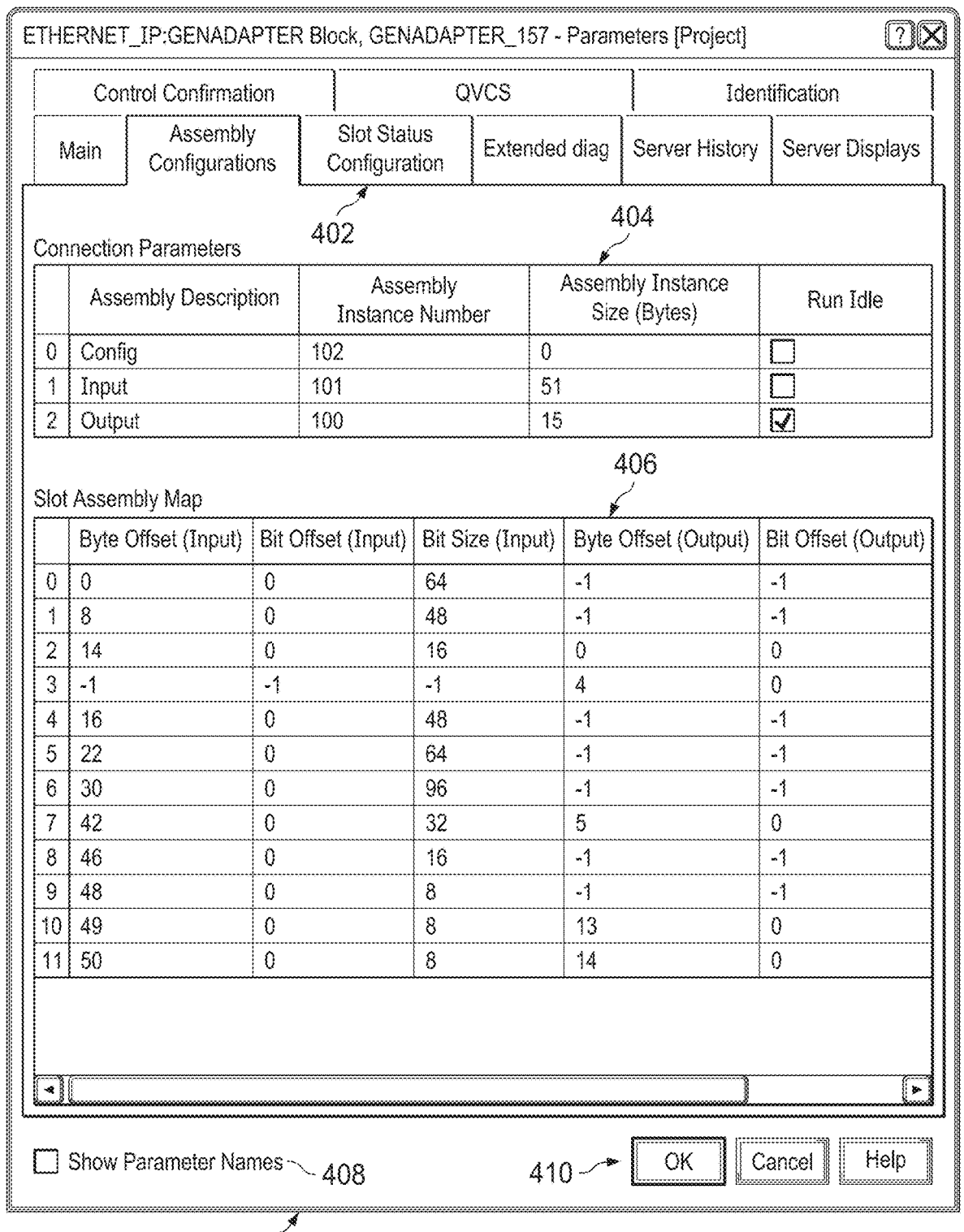
FIGS. 4 through 6 illustrate example graphical user interfaces for supporting the depiction and usage of one logical connection with a collection of I/O modules as multiple individual logical connections according to this disclosure.
Figure 5A:
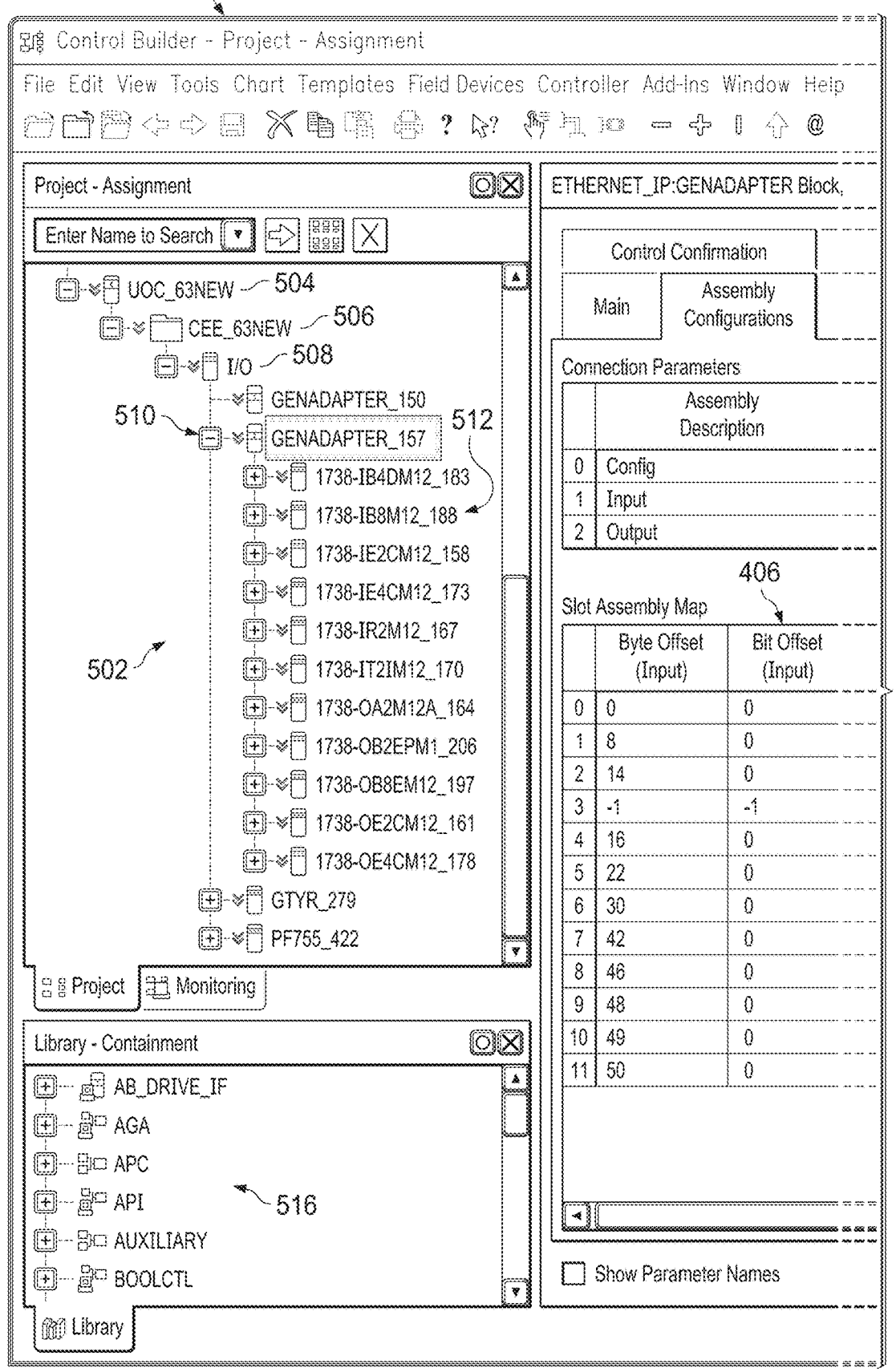
Figure 5B:
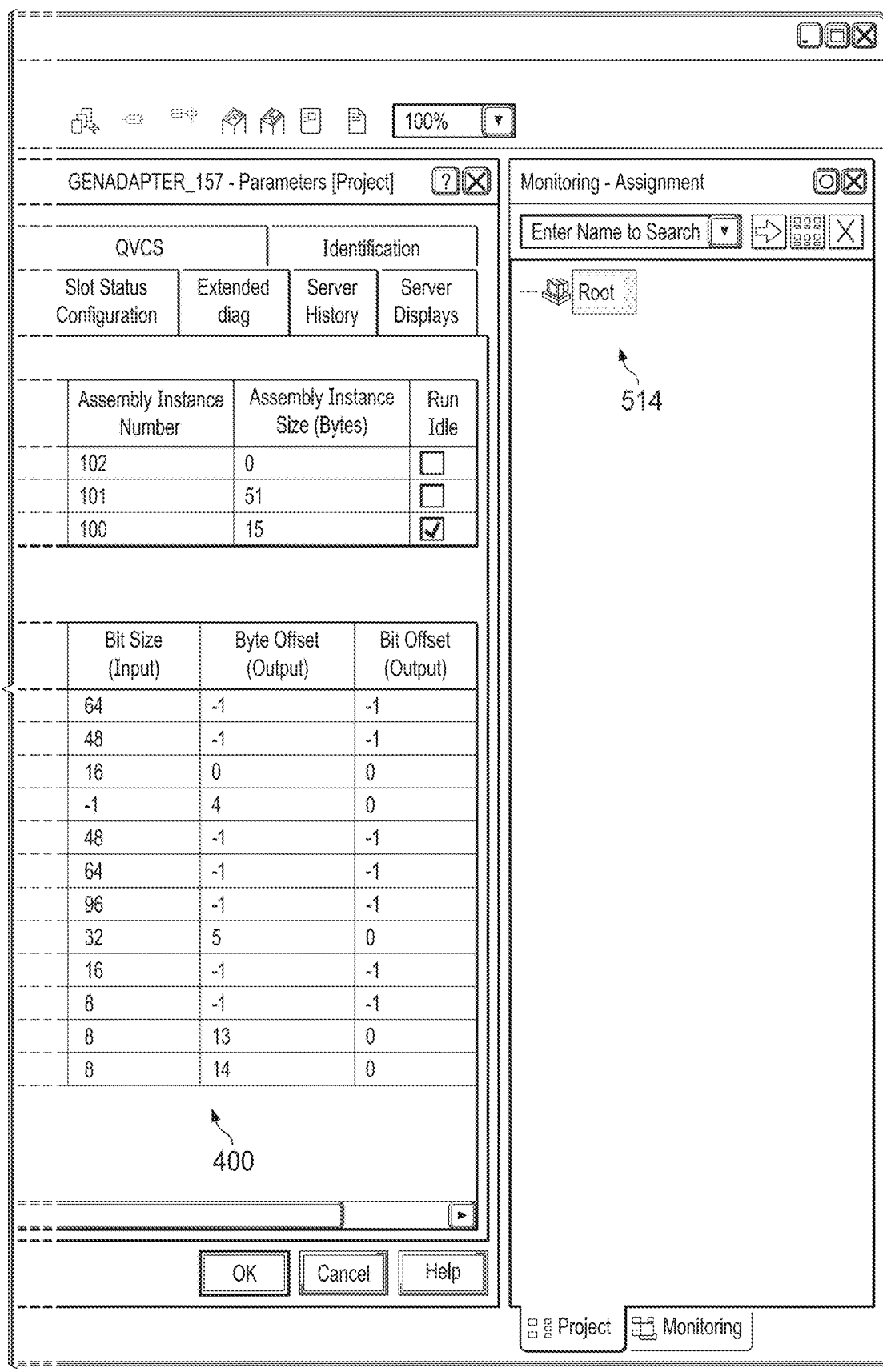
Figure 6:
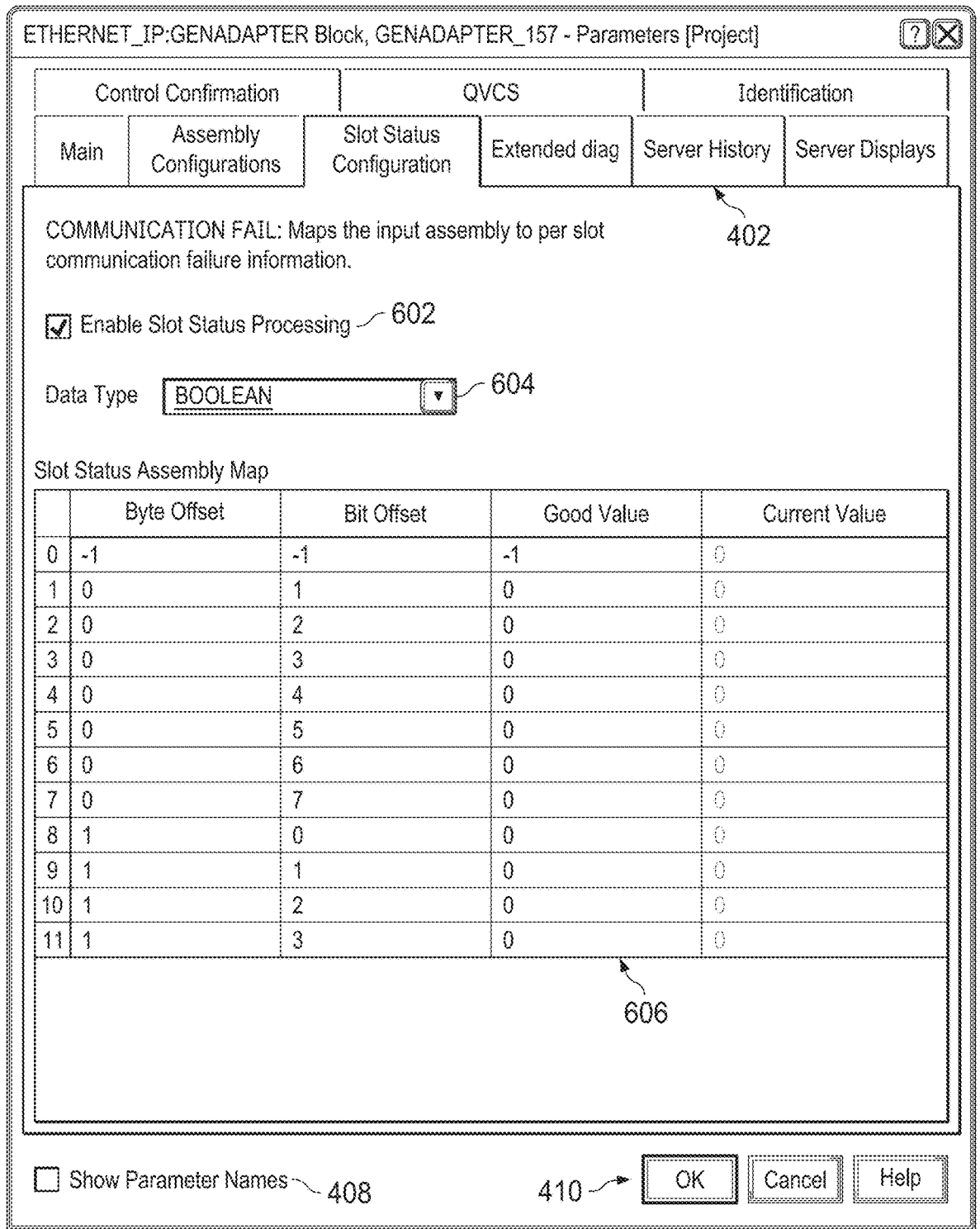

FIGS. 4 through 6 illustrate example graphical user interfaces for supporting the depiction and usage of one logical connection with a collection of I/O modules as multiple individual logical connections according to this disclosure. For ease of explanation, the graphical user interfaces shown in FIGS. 4 through 6 may be described as being generated by the device 300 of FIG. 3 to define a generic adapter 204 as shown in FIG. 2 for use with various components in the system 100 of FIG. 1. However, the graphical user interfaces shown in FIGS. 4 through 6 could be used with any suitable generic adapters, devices, and systems.

As shown in FIG. 4, a graphical user interface 400 can be generated by the processor 302 of the device 300 and presented on a display, such as via an I/O unit 308. The graphical user interface 400 here includes various tabs 402, which allow a user to select and view different content within the graphical user interface 400 related to a generic adapter being configured or re-configured. In this example, the user has selected an "Assembly Configurations" tab 402, which allows the user to define connection parameters and a slot assembly data map for a generic adapter.

More specifically, a table 404 is provided in the graphical user interface 400 and allows a user to view, enter, or change values associated with configuration, input, and output assemblies. As noted above, a configuration assembly defines a configuration of a rack or other collection of I/O modules, an input assembly defines data produced by a rack or other collection of I/O modules, and an output assembly defines data consumed by the rack or other collection of I/O modules. In this particular example, the table 404 provides a description of each assembly, a numerical or other identifier identifying the instance of each assembly, and a size of each assembly. Here, each size is expressed in terms of total bytes, although each size could be expressed in any other suitable manner. The table 404 also provides a checkbox to enable or disable whether protocol-specific header information is supplied or consumed along with input or output data. For example, in EtherNet/IP, a run/idle header indicates if an originator of data is in a program/maintenance/idle state or a run (normal) state. In Profinet, a similar concept can be used for I/O provider status (IOPS) and I/O consumer status (IOCS). There can be similar concepts in other protocols, as well.

A table 406 is also provided in the graphical user interface 400 and allows a user to define the various slots in the slot assembly data map for the generic adapter. Each row of the table 406 defines a single slot, and different rows can define all of the slots associated with an I/O module assembly 104. In this example, each row includes a slot number, which could identify a physical slot in the chassis arrangement of the associated I/O module assembly 104. Each row also identifies a data offset and a data size in a single logical connection 202 for input and a data offset and a data size in the single logical connection 202 for output for the associated physical slot. In this particular example, each offset is expressed in terms of bytes and bits and each size is expressed in terms of total bits, although other expressions for the offsets and sizes could be used. The size of the input for each slot is shown in FIG. 4, while the size of the output for each slot is not shown in FIG. 4 but is viewable using a horizontal scroll bar under the table 406.

Using the table 406, the user can effectively identify the locations in the single logical connection 202 where the input data and the output data for each slot are located. These values allow a controller 106 or other component to identify where input and output data is located within the logical connection 202 for each of the slots. Effectively, this helps the controller 106 or other component to divide the single logical connection 202 into the separate logical connections 208. It should be noted that both input and output offsets and sizes may not be needed for each slot, such as when an I/O module 104*b* is used only for input or only for output (but not both).

A checkbox 408 can be used here to control whether slot numbers or parameter names are displayed in the table 406. This may be useful, for example, to allow a user to identify names of slots rather than slot numbers. Controls 410 can be used by a user to accept or discard the current settings in the tables 404 and 406 or to request additional information.

The graphical user interface 400 can be used to define one or multiple generic adapters 204 for use with one or more controllers 106 or other devices that communicate over single logical connections. For example, as shown in FIGS. 5A and 5B, a graphical user interface 500 can be used to view information about various equipment in a control and automation system. In this example, the graphical user interface 500 includes an equipment tree 502, which can be used to select a specific piece of equipment in the control and automation system. Here, an entry 504 in the tree 502 identifies a specific process controller 106, an entry 506 in the tree 502 identifies a control execution environment associated with the specific process controller 106, and an entry 508 in the tree 502 identifies input/output for the specific process controller 106. Under the entry 508 are various inputs and outputs associated with the specific process controller 106.

In this particular example, the specific process controller 106 includes two entries 510 identifying different generic adapters associated with that controller 106. When one of the entries 510 is expanded, one or more entries 512 can be presented in the tree 502. Each entry 512 identifies a single slot used by the I/O module assembly 104 associated with the generic adapter 204. Each entry 510 can therefore identify all of the slots defined for a single logical connection to a rack or other collection of I/O modules 104*b*. As a result, the entries 512 function as logical representations of the I/O modules 104*b*, and individual I/O modules 104*b* can be represented in software and selected for programming. Moreover, individual I/O modules 104*b* can be represented using a common software representation, regardless of which types of connections (direct or rack/assembly) are used with the I/O modules 104*b*. This allows the use of the representations of the individual I/O modules 104*b* (even in a rack or assembly connection) during programming, such as to create software connections to the individual I/O modules 104*b*. This can help to simplify the overall programming experience involving the various I/O modules 104*b*.

The graphical user interface 400 can be superimposed over the graphical user interface 500, such as when a specific generic adapter is selected in the tree 502. For example, a user could right-click on an entry 510 for a specific generic adapter in the tree 502 and select an option to define the slots associated with the specific generic adapter. Each entry 512 under the selected entry 510 has a corresponding row in the table 406 so that the row in the table 406 identifies the input and output locations for the associated slot. The graphical user interface 400 can therefore be used to define the slot structure of each generic adapter identified by each of the entries 510 in the tree 502.

The graphical user interface 500 here can include various other features to support needed or desired functions. For example, a search function 514 could be used to search for specific equipment in a control and automation system. Also, a library 516 can be used to access various functions or other options associated with equipment in the control and automation system. Note, however, that the other features in the graphical user interface 500 can vary widely depending on the graphical user interface and the desired or required functions.

As shown in FIG. 6, it is also possible for a user to define how status information for multiple I/O modules 104*b* can be obtained. Here, the user has selected a "Slot Status Configuration" tab 402 in the graphical user interface 400, which allows a user to configure the values used for slot status processing. In FIG. 6, the graphical user interface 400 includes a checkbox 602, which allows the user to control whether status processing occurs for the slots. Also, a drop-down menu 604 allows the user to define the data type to be used if status processing occurs. In addition, a table 606 is provided in the graphical user interface 400 and allows the user to view, enter, or change values associated with the status processing. The table 606 here defines a "slot status assembly map" since it identifies where the status values for the slots can be found in the single logical connection 202. Each row of the table 606 defines how values for a single slot are processed to identify a status of that slot. In this example, each row includes a slot number, which could identify a physical slot in the chassis arrangement of the associated I/O module assembly 104. Each row also identifies a data offset in the logical connection 202 to enable mapping of individual slot statuses from the consolidated single logical connection 202. In this particular example, each offset is expressed in terms of bytes and bits, although other expressions for the sizes could be used. Each row further identifies a current value of each slot status and a value that is considered to be a "good" or valid value.

At runtime, a controller 106 or other device can process an input assembly arriving from the I/O modules 104*b* of the I/O module assembly 104 and identify the current value of each slot status in the input assembly. Based on those values and the "good" value provided per slot in the table 606, the controller 106 or other device can process the input assembly and determine if there is a communication failure or any other type of diagnostic data available from the I/O modules 104*b*. The controller 106 or other device can then use the communication failure or other diagnostic data in any suitable manner, such as to generate alarms or other notifications for users.

Although FIGS. 4 through 6 illustrate examples of graphical user interfaces for supporting the depiction and usage of one logical connection with a collection of I/O modules as multiple individual logical connections, various changes may be made to FIGS. 4 through 6. For example, while various input/output mechanisms (such as tabs, checkboxes, drop-down menus, trees, and tables) are shown here, any other suitable mechanisms can be used to obtain data from or provide data to one or more users. Also, the layout and arrangement of the information in the graphical user interfaces are for illustration only. Other graphical user interfaces could be used to present information about depicting and using one logical connection with a collection of I/O modules as multiple individual logical connections.

Figure 7:
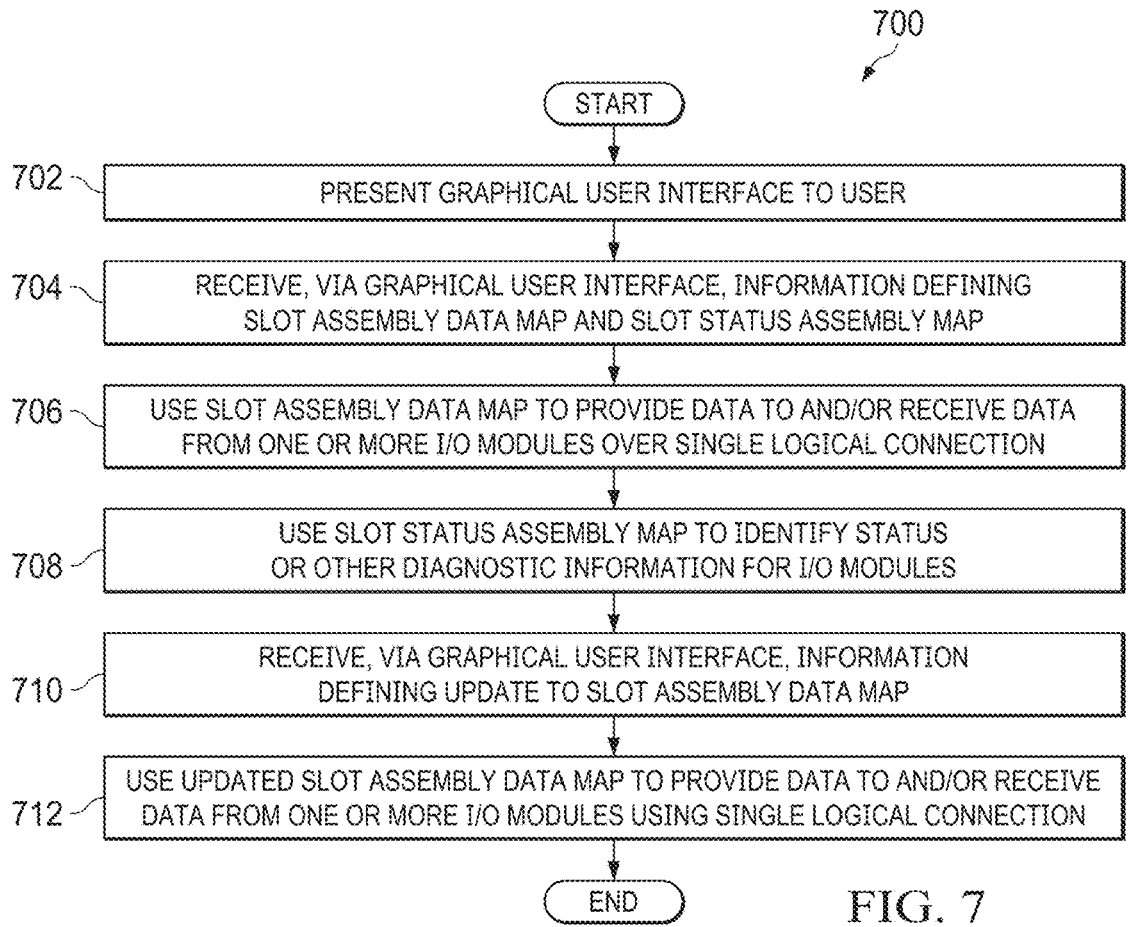
FIG. 7 illustrates an example method for supporting the depiction and usage of one logical connection with a collection of I/O modules as multiple individual logical connections according to this disclosure.

FIG. 7 illustrates an example method 700 for supporting the depiction and usage of one logical connection with a collection of I/O modules as multiple individual logical connections according to this disclosure. For ease of explanation, the method 700 is described as involving the device 300 of FIG. 3 in the system 100 of FIG. 1 with the graphical user interfaces of FIGS. 4 through 6. However, the method 700 could involve the use of any suitable devices in any suitable systems and any suitable graphical user interfaces.

As shown in FIG. 7, a graphical user interface is presented to a user at step 702. This could include, for example, the processor 302 of the device 300 generating the graphical user interface 400 and presenting the graphical user interface 400 to a user on a display of an operator station 110 or other user device. The graphical user interface 400 could be presented over the graphical user interface 500 or in any other suitable manner. As noted above, the graphical user interface 400 includes a table 406 identifying multiple slots, which are configured to be coupled to multiple I/O modules 104*b* of an I/O module assembly 104. The slots could represent physical slots of a backplane 104*c* of the I/O module assembly 104. The slots could be identified using slot numbers, parameter names, or any other suitable identifiers.

Information defining a slot assembly data map and (optionally) a slot status assembly map is received from the user via the graphical user interface at step 704. This could include, for example, the processor 302 of the device 300 receiving values entered by the user into the table 406 of the graphical user interface 400 to define the slot assembly data map. These values can identify data offsets and data sizes associated with the I/O modules 104*b*, so the data offsets and the data sizes identify where data sent to or from the I/O modules 104*b* is located in a single logical connection 202. This could also include the processor 302 of the device 300 receiving values entered by the user into the table 606 of the graphical user interface 400 to define the slot status assembly map. These values can identify data offsets associated with diagnostic information about the I/O modules 104*b*, so the data offsets identify where statuses or other diagnostic data from the I/O modules 104*b* is located in the single logical connection 202.

The slot assembly data map is used to provide data to and/or receive data from one or more of the multiple I/O modules over the single logical connection at step 706. This could include, for example, the processor 302 of the device 300 receiving programming involving each slot (such as via the graphical user interface 500), where the programming defines multiple software connections between one or more controllers 106 or other devices and the I/O modules 104*b* of the I/O module assembly 104. This could also include the data offsets and data sizes from the table 406 being used by the one or more controllers 106 or other devices to identify where data should be transmitted over the single logical connection 202 to the I/O modules 104*b* (such as in an output assembly) and where data should be received over the single logical connection 202 from the I/O modules 104*b* (such as in an input assembly). Among other things, this allows data from a controller 106 to be split across two or more software representations of two or more I/O modules 104*b* and for the controller 106 to receive data from the I/O modules 104*b*.

Optionally, the slot status assembly map can be used to identify status or other diagnostic information for one or more of the I/O modules at step 708. This could include, for example, the data offsets from the table 606 being used by the one or more controllers 106 or other devices to identify where status or other diagnostic information received from the I/O modules 104b is located in the single logical connection 202 (such as in an input assembly). This could also include using the status or other diagnostic information to identify if there is a communication failure or other issues affecting the I/O modules 104b.

An update to the slot assembly data map can be received via the graphical user interface at step 710. This could include, for example, the processor 302 of the device 300 receiving one or more new values updating the slot assembly data map in the table 406 of the graphical user interface 400. The update here may be needed or desired for various reasons. Updates may be needed, for instance, when one or more I/O modules 104b are being replaced, two or more I/O modules 104b are being reordered within a rack, or one or more I/O modules 104b have a firmware update that changes input to or output from the I/O modules 104b. The updated slot assembly data map can be used to provide data to and/or receive data from one or more of the multiple I/O modules over the single logical connection at step 712. This can occur in the same manner as in step 706, and no changes may need to be made to the programming involving the I/O modules 104b other than using the new value(s) in the slot assembly data map.

Although FIG. 7 illustrates one example of a method 700 for supporting the depiction and usage of one logical connection with a collection of I/O modules as multiple individual logical connections, various changes may be made to FIG. 7. For example, while shown as a series of steps, various steps in FIG. 7 could overlap, occur in parallel, occur in a different order, or occur any number of times.

It should be noted that while often described here as involving the depiction and usage of one logical connection with a collection of I/O modules as multiple individual logical connections, there could be instances where multiple logical connections exist with a collection of I/O modules. For example, there could actually be multiple logical connections between a controller 106 and an I/O module assembly 104, such as when multiple redundant logical connections are used over one or more networks 107 or where different logical connections are used with different subsets of I/O modules 104b. In cases such as those, the inventive techniques described in this patent document could be used to cause each of at least one of the actual logical connections to appear as multiple logical connections. As long as a user wishes an actual logical connection to appear as multiple logical connections, the inventive techniques described in this patent document can be used, regardless of the actual number of actual logical connections.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for depicting and using a single logical connection with multiple input/output (I/O) modules in an industrial process control and automation system comprising:
   presenting a graphical user interface to a user, the graphical user interface identifying multiple slots that are configured to be coupled to the multiple input/output (I/O) modules;
   allowing, using an adapter tool, one or more users to define a generic adapter representation of a head end module and a slot assembly data map for the multiple I/O modules;
   receiving, from the user via the graphical user interface, information defining a slot assembly data map, the slot assembly data map identifying data offsets and data sizes associated with the I/O modules, the data offsets and the data sizes identifying where data can be sent to or received from the multiple I/O modules over the single logical connection, wherein the slot assembly data map provides information defining how data is parsed automatically during runtime in order to communicate with the different I/O modules over the single logical connection; and using, by the generic adaptor representation, the slot assembly data map to define logical representations of the I/O modules in a rack or other collection;

using the data offsets and the data sizes of the slot assembly data map to provide data to or receive data from one or more of the I/O modules over the single logical connection;

identifying status or other diagnostic information for one or more of the I/O modules using the slot assembly data map; and receiving information defining an update to the slot assembly data map, wherein the update is associated with a replacement of one or more of the I/O modules, a reordering of two or more of the I/O modules, or a firmware update of one or more of the I/O modules that changes at least one of the data offsets or at least one of the data sizes, and wherein the adaptor tool is configured to obtain data from the one or more users defining how slot status processing occurs, which allows one or more controllers or other devices to identify diagnostic information for each I/O module received over the single logical connection.

2. The method of claim 1, further comprising:

receiving, from the user via the graphical user interface, information defining a slot status assembly map, the slot status assembly map identifying additional data offsets associated with the I/O modules, the additional data offsets identifying where diagnostic data can be received from the multiple I/O modules over the single logical connection; and using the additional data offsets of the slot status assembly map to obtain diagnostic data from at least one of the I/O modules over the single logical connection.

3. The method of claim 1, wherein the slot assembly data map defines a split of data from a single device across two or more software representations of the I/O modules.

4. The method of claim 1, wherein:

using the data offsets and the data sizes of the slot assembly data map comprises using the slot assembly data map to provide or receive data associated with a consolidated configuration assembly, a consolidated input assembly, and a consolidated output assembly;

the consolidated configuration assembly comprises data defining a configuration of a collection of the I/O modules;

the consolidated input assembly comprises data produced by the collection of the I/O modules; and the consolidated output assembly comprises data consumed by the collection of the I/O modules.

5. The method of claim 1, further comprising:

generating a second graphical user interface containing logical representations of the I/O modules;

wherein the logical representations of the I/O modules comprise a common representation, regardless of one or more types of connections between the I/O modules and an industrial process controller.

6. The method of claim 1, wherein the single logical connection communicatively couples a head end module of an I/O module assembly to an industrial process controller, the head end module configured to communicate with the I/O modules through a backplane comprising the slots.

7. An apparatus for depicting and using a single logical connection with multiple input/output (I/O) modules in an industrial process control and automation system comprising:

at least one processing device configured to:

generate a graphical user interface for presentation to a user, the graphical user interface identifying multiple slots that are configured to be coupled to the multiple input/output (I/O) modules;

allow, using an adapter tool, one or more users to define a generic adapter representation of a head end module and a slot assembly data map for the multiple I/O modules;

receive, from the user via the graphical user interface, information defining a slot assembly data map, the slot assembly data map identifying data offsets and data sizes associated with the I/O modules, the data offsets and the data sizes identifying where data can be sent to or received from the multiple I/O modules over the single logical connection, wherein the slot assembly data map provides information defining how data is parsed automatically during runtime in order to communicate with the different I/O modules over the single logical connection; and use, by the generic adaptor representation, the slot assembly data map to define logical representations of the I/O modules in a rack or other collection;

use the data offsets and the data sizes of the slot assembly data map to provide data to or receive data from one or more of the I/O modules over the single logical connection;

identify status or other diagnostic information for one or more of the I/O modules using the slot assembly data map; and receiving information defining an update to the slot assembly data map, wherein the update is associated with a replacement of one or more of the I/O modules, a reordering of two or more of the I/O modules, or a firmware update of one or more of the I/O modules that changes at least one of the data offsets or at least one of the data sizes, and wherein the adaptor tool is configured to obtain data from the one or more users defining how slot status processing occurs, which allows one or more controllers or other devices to identify diagnostic information for each I/O module received over the single logical connection.

8. The apparatus of claim 7, wherein the at least one processing device is further configured to:

receive, from the user via the graphical user interface, information defining a slot status assembly map, the slot status assembly map identifying additional data offsets associated with the I/O modules, the additional data offsets identifying where diagnostic data can be received from the multiple I/O modules over the single logical connection; and use the additional data offsets of the slot status assembly map to obtain diagnostic data from at least one of the I/O modules over the single logical connection.

9. The apparatus of claim 7, wherein:

the at least one processing device is configured to use the data offsets and the data sizes of the slot assembly data map to provide or receive data associated with a consolidated configuration assembly, a consolidated input assembly, and a consolidated output assembly;

the consolidated configuration assembly comprises data defining a configuration of a collection of the I/O modules;

the consolidated input assembly comprises data produced by the collection of the I/O modules; and the consolidated output assembly comprises data consumed by the collection of the I/O modules.

10. The apparatus of claim 7, wherein:

the at least one processing device is further configured to generate a second graphical user interface containing logical representations of the I/O modules; and each of the logical representations of the I/O modules comprises a common representation, regardless of one or more types of connections between the I/O modules and an industrial process controller.

11. The apparatus of claim 7, wherein:

the at least one processing device is further configured to generate a second graphical user interface; and the second graphical user interface comprises a tree identifying:

different equipment; and for specific equipment, (i) an adapter associated with the specific equipment and representing a collection of the I/O modules and (ii) each of the I/O modules in the collection of the I/O modules.

12. The apparatus of claim 7, wherein the slot assembly data map identifies, for each slot, at least one of:

an offset and a size for input; and an offset and a size for output.

13. At least one non-transitory computer readable medium containing instructions for depicting and using a single logical connection with multiple input/output (I/O) modules in an industrial process control and automation systems that when executed cause at least one processing device to:

generate a graphical user interface for presentation to a user, the graphical user interface identifying multiple slots that are configured to be coupled to the multiple input/output (I/O) modules;

allow, using an adapter tool, one or more users to define a generic adapter representation of a head end module and a slot assembly data map for the multiple I/O modules;

receive, from the user via the graphical user interface, information defining a slot assembly data map, the slot assembly data map identifying data offsets and data sizes associated with the I/O modules, the data offsets and the data sizes identifying where data can be sent to or received from the multiple I/O modules over the single logical connection, wherein the slot assembly data map provides information defining how data is parsed automatically during runtime in order to communicate with the different I/O modules over the single logical connection; and use, by the generic adaptor representation, the slot assembly data map to define logical representations of the I/O modules in a rack or other collection;

use the data offsets and the data sizes of the slot assembly data map to provide data to or receive data from one or more of the I/O modules over the single logical connections;

identify status or other diagnostic information for one or more of the I/O modules using the slot assembly data map; and receive information defining an update to the slot assembly data map, wherein the update is associated with a replacement of one or more of the I/O modules, a reordering of two or more of the I/O modules, or a firmware update of one or more of the I/O modules that changes at least one of the data offsets or at least one of the data sizes, and wherein the adaptor tool is configured to obtain data from the one or more users defining how slot status processing occurs, which allows one or more controllers or other devices to identify diagnostic information for each I/O module received over the single logical connection.

14. The at least one non-transitory computer readable medium of claim 13, further containing instructions that when executed cause at least one processing device to:

receive, from the user via the graphical user interface, information defining a slot status assembly map, the slot status assembly map identifying additional data offsets associated with the I/O modules, the additional data offsets identifying where diagnostic data can be received from the multiple I/O modules over the single logical connection; and use the additional data offsets of the slot status assembly map to obtain diagnostic data from at least one of the I/O modules over the single logical connection.

15. The at least one non-transitory computer readable medium of claim 13, wherein:

the instructions that when executed cause the at least one processing device to use the data offsets and the data sizes of the slot assembly data map comprise:

instructions that when executed cause the at least one processing device to provide or receive data associated with a consolidated configuration assembly, a consolidated input assembly, and a consolidated output assembly;

the consolidated configuration assembly comprises data defining a configuration of a collection of the I/O modules;

the consolidated input assembly comprises data produced by the collection of the I/O modules; and the consolidated output assembly comprises data consumed by the collection of the I/O modules.

16. The at least one non-transitory computer readable medium of claim 13, wherein:

the at least one non-transitory computer readable medium further contains instructions that when executed cause the at least one processing device to generate a second graphical user interface containing logical representations of the I/O modules; and each of the logical representations of the I/O modules comprises a common representation, regardless of one or more types of connections between the I/O modules and an industrial process controller.

17. The at least one non-transitory computer readable medium of claim 13, wherein:

the at least one non-transitory computer readable medium further contains instructions that when executed cause the at least one processing device to generate a second graphical user interface containing logical representations of the I/O modules; and the second graphical user interface comprises a tree identifying:

different equipment; and for specific equipment, (i) a generic adapter associated with the specific equipment and representing a collection of the I/O modules and (ii) each of the I/O modules in the collection of the I/O modules.

* * * * *